(12) United States Patent
Saxena et al.

(10) Patent No.: US 10,349,227 B2
(45) Date of Patent: Jul. 9, 2019

(54) PERSONAL SAFETY SYSTEM

(71) Applicant: Intel Corporation, Santa Clara, CA (US)

(72) Inventors: Paritosh Saxena, Portland, OR (US); David I Poisner, Carmichael, CA (US); Nicholas Triantafillou, Portland, OR (US); Casey Baron, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/929,952

(22) Filed: Nov. 2, 2015

(65) Prior Publication Data
US 2017/0127257 A1 May 4, 2017

(51) Int. Cl.
| | | |
|---|---|---|
| *H04W 4/06* | (2009.01) | |
| *H04W 4/90* | (2018.01) | |
| *H04W 4/02* | (2018.01) | |
| *H04W 4/60* | (2018.01) | |

(52) U.S. Cl.
CPC ............ *H04W 4/06* (2013.01); *H04W 4/023* (2013.01); *H04W 4/60* (2018.02); *H04W 4/90* (2018.02)

(58) Field of Classification Search
CPC ......... H04W 4/22; H04W 4/06; H04W 4/023; H04W 4/029; H04W 76/50; H04L 67/10
USPC .......................................... 455/401.1, 404.2
See application file for complete search history.

(56) References Cited

U.S. PATENT DOCUMENTS

| | | | | |
|---|---|---|---|---|
| 7,248,883 | B2* | 7/2007 | Cuffaro | G01S 5/02 455/456.1 |
| 8,674,853 | B2* | 3/2014 | Gorabi | G08B 25/009 340/539.18 |
| 2007/0238484 | A1* | 10/2007 | Liu | H04M 1/6066 455/557 |
| 2008/0020781 | A1* | 1/2008 | Cho | H04W 76/50 455/456.1 |
| 2011/0071880 | A1* | 3/2011 | Spector | H04W 4/22 340/573.1 |
| 2014/0368336 | A1* | 12/2014 | Felix | H04W 4/90 340/539.13 |
| 2014/0368601 | A1* | 12/2014 | deCharms | H04W 4/021 348/14.02 |
| 2015/0269824 | A1* | 9/2015 | Zhang | G08B 21/0438 340/539.12 |
| 2015/0304984 | A1* | 10/2015 | Khemani | H04W 64/003 455/456.1 |
| 2015/0312885 | A1* | 10/2015 | Pang | H04W 52/0219 370/312 |
| 2015/0327039 | A1* | 11/2015 | Jain | H04W 4/22 455/404.2 |
| 2017/0124853 | A1* | 5/2017 | Mehta | H04W 4/90 |

\* cited by examiner

*Primary Examiner* — Magdi Elhag
(74) *Attorney, Agent, or Firm* — Schwegman Lundberg & Woessner, P.A.

(57) ABSTRACT

Various systems and methods for a personal safety system are described herein. A personal safety system includes an alert detection module to receive, at a device, input indicating an alert event; and a communication module to: transmit information regarding the alert event to a cloud service; and broadcast wireless network information of a wireless environment around the device, obtained by the device, to a plurality of devices in the wireless environment.

24 Claims, 8 Drawing Sheets

PERSONAL SAFETY SYSTEM

TECHNICAL FIELD

Embodiments described herein generally relate to emergency response systems and in particular, to a personal safety system.

BACKGROUND

Timely response to an emergency call is crucial. When an emergency call is made, it is usually routed to a call center or other central agency. From there, the content of the call is assessed and appropriate response teams are assigned and directed to the location of the emergency. The quality of the service provided by the response teams varies greatly from region to region and from country to country.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide a personal safety system. In many areas, the quality of emergency response services reflect the economic and technological development of the area. In some poorer areas, such as underdeveloped nations or rural countryside, the emergency response infrastructure and resources are correspondingly lacking. In some developing countries the authorities are slow to respond, if they respond at all. At the same time, in many areas with underdeveloped emergency response infrastructure, there is a high adoption rate of technology, such as smartphones, Internet, social networks, and the like.

The systems and methods described herein improve the emergency response systems by augmenting them with consumer devices. Using smartphones, Wi-Fi base stations, and back-end services, friends and volunteers are able to quickly respond to a person in distress. Additionally, the systems may gather evidence that may be used to document the emergency event for later user, such as to determine liability for insurance or identify a perpetrator. The systems may integrate with existing emergency services, such as E-911 response systems.

Figure 1:
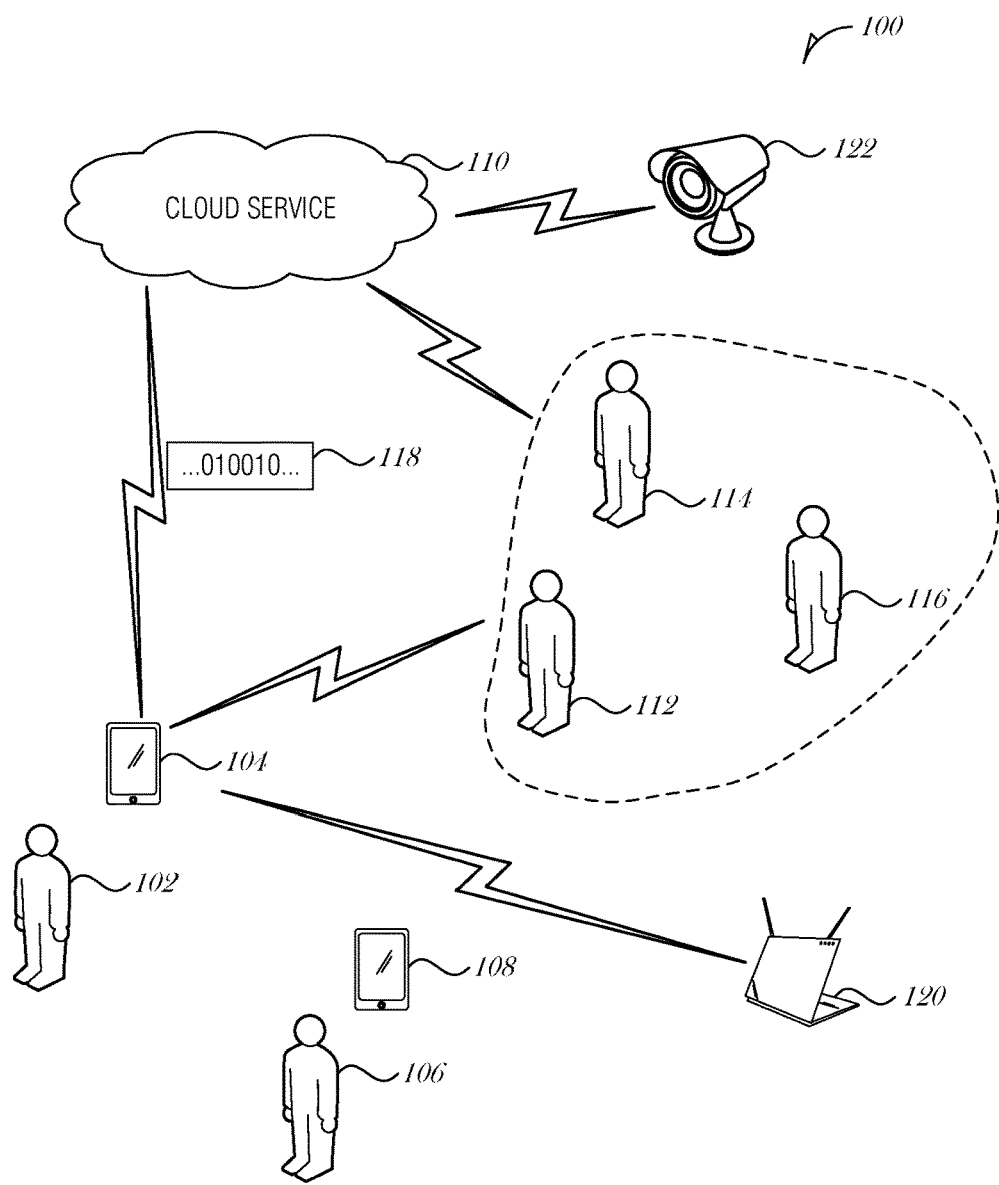
FIG. 1 is a diagram illustrating an operating environment, according to an embodiment.

FIG. 1 is a diagram illustrating an operating environment 100, according to an embodiment. The operating environment 100 includes a user 102 with a mobile user device 104. The mobile user device 104 (or user device) may be any type of mobile compute device including, but not limited to a mobile phone, a smartphone, a phablet, a tablet, a personal digital assistant, a laptop, a digital camera, an in-vehicle infotainment system, a wearable device, or the like. In the scenario depicted in FIG. 1, the user 102 is being threatened by an attacker 106. The threat may be an actual threat (e.g., being physically restrained or being robbed at knifepoint) or a perceived threat (e.g., being nervous about a person standing in a dark alley). As such, the user 102 may be referred to as a victim or potential victim in some examples.

The attacker 106 may also be using or carrying a mobile user device 108. The mobile user device 108 may be of a similar form factor or device type as that of the mobile user device 104 being used by the user 102. Each of the mobile devices may include one or more wireless transmission communication mechanisms. Examples of wireless communication mechanisms include, but are not limited to close proximity wireless mediums (e.g., radio frequency (RF) such as based on the Near Field Communications (NFC) standard, infrared (IR), etc.), short-range wireless mediums (e.g., Bluetooth, wireless local area networking (WLAN), Wi-Fi, etc.) and long-range wireless mediums (e.g., cellular wide area radio communication technology, satellite technology, etc.).

Upon recognizing a situation, the user 102 may trigger an event via the mobile user device 104. Initially, note that the term "event," as referenced herein, may refer to any occurrence that may involve responsive action. While events may include emergency situations involving a person or people, this example is merely for the use of explanation. Embodiments consistent with the present disclosure may apply to any happening involving the public. Thus, non-emergency events are also encompassed by the present disclosure.

The user 102 may trigger the event using a user interface provided on the mobile user device 104, such as by activating a "Panic" button on the screen of the mobile user device 104. The event may also be triggered using various other input mechanisms, such as with a hard button on the exterior of the mobile user device 104, using voice analysis or other sound analysis to detect an emergency situation, using a gesture input on a touchscreen of the mobile user device 104, or the like. Thus, the user 102 may manually trigger an event notification, sensors within (or at least coupled to) the mobile user device 104 may detect an event, etc. Example sensor-based event detection may include, but is not limited to, biologic sensors coupled to the mobile user device 104 may detect that the user 102 is experiencing physiological difficulty (e.g., is experiencing choking, heart attack, stroke, etc.), motion/acceleration/orientation sensors in the mobile user device 104 may detect conditions consistent with a vehicular accident (e.g., bicycle, car, bus, etc.), a natural disaster (e.g., earthquake, tornado, forest fire, blizzard, etc.), etc.

In response to the event being triggered, the mobile user device 104 may call for help by transmitting an alert to a cloud service 110. The cloud service 110 may then notify one or more responders 112, 114, and 116. Although three responders are illustrated, it is understood that any number of potential responders may be notified. In addition, the mobile user device 104 may call for help locally by transmitting an alert to one or more of the responders over a short-range wireless medium, such as Bluetooth or Wi-Fi.

In a communication 118 between the mobile user device 104 and the cloud service 110, the mobile user device 104 may transmit various data about the user 102 and the operating environment 100. The mobile user device 104 may transmit the user's identity, last known location (e.g. obtained from GPS), wireless signal strengths of the devices in the operating environment 100, media access control (MAC) addresses of the devices in the operating environment 100, and the like. The communication 118 may be digitally signed to indicate the authenticity of the mobile user device 104 or the user 102. The MAC addresses of the devices in the area may be used as evidence when later investigating the event. The attacker 106 may have one or more wireless radios enabled on the mobile user device 108, which may broadcast its MAC address as part of a discovery protocol. Due to the way Wi-Fi was designed, for example, a device searching for Wi-Fi access points (APs) includes its MAC address as part of the probe requests it broadcasts. Thus, as the user 102 and the attacker 106 move around the operating environment 100, the MAC addresses of the respective devices are available to those who sniff the network. Referencing the MAC address may lead an investigator to the attacker 106.

When surveying the local devices in the operating environment 100, the mobile user device 104 may also detect one or more wireless access points (APs) 120. Some of the APs 120 may be associated with the cloud service 110. For example, an owner of an AP 120 may subscribe to the cloud service 110 and provide a geolocation to the cloud service 110. This geolocation may be used by the mobile user device 104 in trilateration. Using one or more APs 120 that provide their fixed locations, the mobile user device 104 may better estimate its own location.

In addition or alternative to using fixed location based trilateration, the mobile user device 104 may perform an ad-hock Wi-Fi trilateration. By analyzing received signal strength indicators (RSSI) over time from one or more a responders' devices, the mobile user device 104 may determine how far away each responder device is and from which direction the responder is approaching.

Similarly, the responders 112, 114, or 116 may have their own mobile devices, which may also perform the sniffing function to obtain RSSI measurements from devices in the operating environment 100. The responders' devices may also scan for MAC addresses of devices in the operating environment 100 and record them or upload them to the cloud service 110. Based on the RSSI of the user 102, a responder 112, 114, or 116 may be directed toward the user 102. The RSSI of the user 102 may be combined with other RSSIs of APs in the area, other mobile devices in the area, or other location markers (e.g., GPS coordinates) to provide an absolute or relative location of the user 102 to the responders 112, 114, or 116.

The APs in the area may also act similarly to a device of a responder 112, 114, or 116, or the mobile user device 104. In particular, APs may assist with trilateration; scan for and record Wi-Fi signal strengths, MAC addresses, and other information about devices in the operating environment 100; and transmit authenticated packets with its own information. The APs may upload information to the cloud service 110 for safe storage. The information may include Wi-Fi signal strengths around the time of the event, which may be used to recreate peoples' movement during the period. The information may also include MAC addresses present in the operating environment 100 around the time of the event. The MAC addresses may be used to identify the people or devices, which may be useful when investigating a crime, for example.

Figure 2:
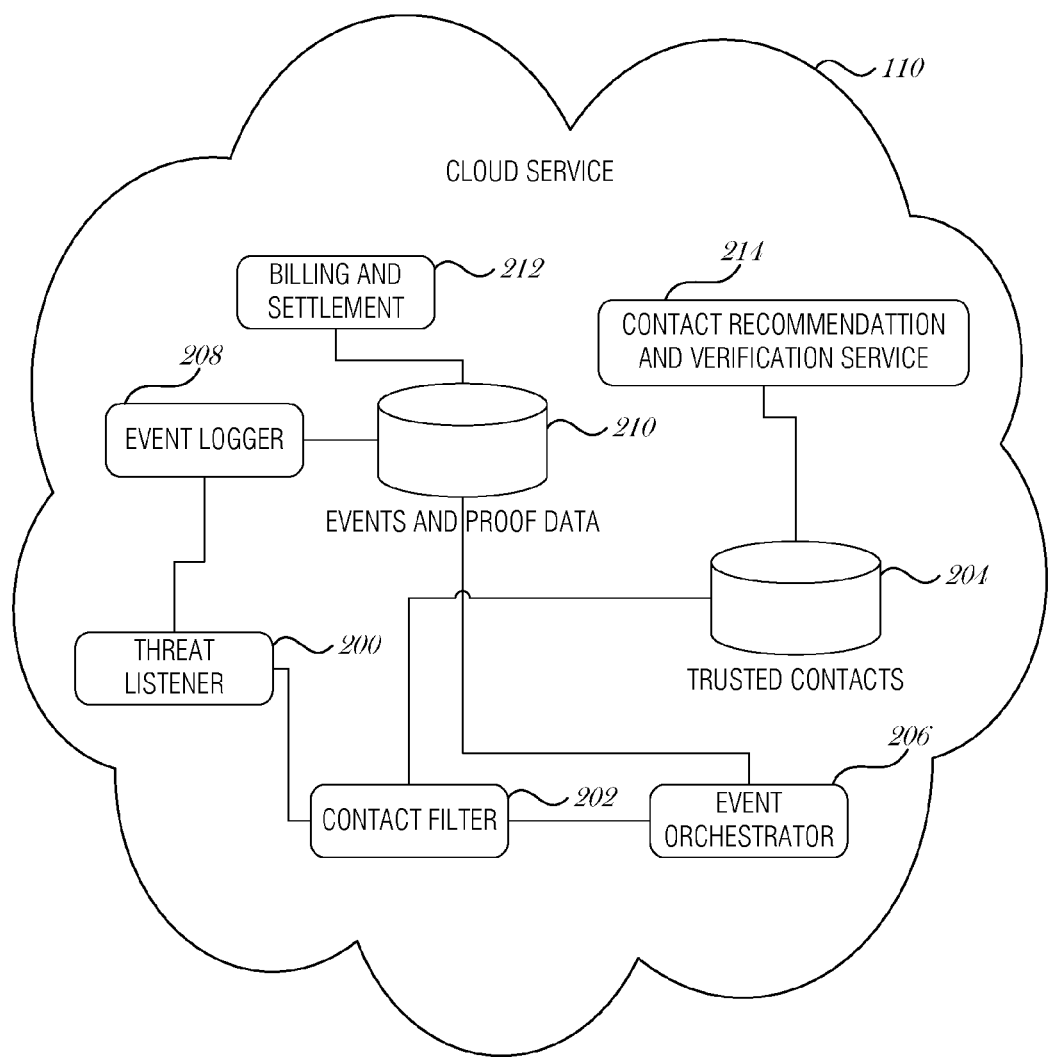
FIG. 2 is a diagram illustrating the cloud service, according to an embodiment.

Other wireless devices may be in the operating environment 100. For example, some volunteers may provide an old wireless cellular phone and just leave it powered on to act as another wireless beacon in the system. As another example, a wireless camera 122 may be used as a beacon. The wireless camera 122 may also be used to capture images or video of the operating environment 100 for documentation. The wireless camera 122 may upload its content to the cloud service 110. The other wireless devices may act similar to other responder devices or the APs 120, for example by collecting wireless signal data, relaying such data to other devices in the operating environment 100, uploading such data to the cloud service 110, or reacting to direction from the FIG. 2 is a diagram illustrating the cloud service 110, according to an embodiment. In general, the cloud service 110 acts to monitor for alarm messages, notify responders, log and store data regarding the event, and provide additional services. The user 102 may be a subscriber to the cloud service 110. For example, the user 102 may purchase access to the cloud service 110, install an application on the mobile user device 104 to access the cloud service 110, and then provide information to the cloud service 110 when an event occurs. Other users may subscribe to the cloud service 110 as responders.

Responders may be classified into one or more categories. Example categories include, but are not limited to professional responders, predesignated responders, and helpers. A professional responder is one that has specific skills, such as a physician or a police officer. Professional responders may provide an audit of their skillset to the cloud service 110, which may be referred to later when an event occurs. Predesignated responders are those that are related to the user 102 and designated by the user 102 as being preferred responders. Examples include the user's father, sister, brother-in-law, teacher, best friend, etc. Predesignated responders may receive notifications of the event even when they are not in the immediate vicinity of the event (e.g., they cannot actively respond). Helpers are responders that participate in the response, but not directly. Helpers may be volunteers or good Samaritans that look to help out when they can. Helpers may not have any specific emergency response skills, but may be useful to document activities around the event, capture Wi-Fi or Bluetooth signals and record them, or act as another beacon for trilateration.

Responders may also be subscribers to the cloud service 110. Rewards may be provided to responders for their participation in assisting a person in need. Users of the cloud service 110 who rely on the emergency response may also be registered as responders.

The cloud service 110 includes a threat listener 200, which listens for incoming requests for assistance from users of the cloud service 110. The threat listener 200 may be a dedicated and protected server provided by the cloud service 110. When the user 102 activates an alarm on the mobile user device 104, a message may be transmitted to the threat listener 200 with information identifying the user 102, the type of event, the location of the mobile user device 104, signals and their strengths in the area around the mobile user device 104, and other information. The information transmitted may be encoded using a private key that may be verified using a public key available from the cloud service 110.

Upon receiving an alert message from the user 102, the threat listener 200 may communicate with a contact filter 202 of the cloud service 110. The contact filter 202 may be used to determine who, if anyone, should be contacted regarding the alert message. For example, the contact filter 202 may reference a trusted contacts database 204, which maintains relationships between the user 102 and preferred or predesignated contacts. The 204 may also use the location provided by the user 102 to determine the identities of potential responders in the area of the user 102. Information about potential responders is communicated to an event orchestrator 206.

The event orchestrator 206 performs several activities, which may include coordinating the responders' activities, relaying the alert to appropriate authorities, recording data from several data feeds for evidence, and maintaining the status of the alert until the event is concluded or resolved. The event orchestrator 206 may act with an event logger 208 to record data into an events and proof database 210. As data is provided to the cloud service 110 from the user 102 or responders (e.g., 112, 114, or 116), the data may be tagged with an event identifier and stored in the events and proof database 210. Data may include wireless signals detected around the area of the event, the type of event, the time or duration of the event, information about the responders and what actions each performed, information about authorities or other emergency response personnel (e.g., police response or ambulance response), video or audio obtained at or around the area of the event, and the like. Data may be obtained from the user's device, responders' devices, access points in the area that are enrolled with the cloud service 110, cameras in the area, drones, or other devices in proximity to the event.

The event orchestrator 206 may relay the alert to appropriate authorities. For example, when an alert is received regarding a fire in a building, the event orchestrator 206 may automatically inform an appropriate fire department or an emergency response call center. As another example, if an alert is received indicating a kidnapping, then the event orchestrator 206 may relay the information about the alert to an AMBER alert notification system, police response, or transmit AMBER alert-type information to registered users of the cloud service 110 in the area of the alert.

The event orchestrator 206 may coordinate responders' activities. The event orchestrator 206 may direct a responder to perform one or more actions. Such actions may be based on the classification of responder, as set by the responder when registering with the cloud service 110 or as set by the cloud service 110 based on abilities of the responder, proximity of the responder, or other information. For example, a helper responder may be directed to begin to record video data in a particular direction (e.g., North). The video may be uploaded to the cloud service 110 and stored in the events and proof database 210. The content of the video may be later analyzed to determine whether the attacker 106 or an accomplice was captured in the video. Other responders may be directed to the user 102 position for help with medical assistance or to capture or restrain the attacker 106.

The event orchestrator 206 may coordinate responders movements to increase the accuracy of Wi-Fi trilateration. The event orchestrator 206 may assign secondary emergency response tasks to specific responders based on: current location/destination route, anticipated needs (based on event context data), responder/victim requests, or responder skills/equipment. For example, off duty law enforcement may be directed around site perimeters. In another example, a nurse may be sent directly to the victim's side, while at the same time one secondary responder is asked to bring ice from the kitchen and another is asked to grab towels from the restroom along the way. The event orchestrator 206 may also direct surplus responders/bystanders away from the crisis point along a safe path to an evacuation point, which may also include assisting at-risk individuals in doing the same along the way. This may help reduce the risk of early responders blocking the path to professionals, as well as reduce the number of potential responders in harm's way.

The event orchestrator 206 may also coordinate other response activities, such as the activation and direction of autonomous vehicles, drones, or robots. The vehicles, drones, or robots may be used to record data around the event, deploy emergency equipment (e.g., a defibrillator), or assist with aid (e.g., act as another access point to increase trilateration accuracy, act as crowd control, inspect a burning building, or the like). Information about the environment or about the operation of the vehicle, drone, or robot may be uploaded to the cloud service 110 and stored in the events and proof database 210.

After the event is concluded, the event orchestrator 206 may settle up with the responders. For example, a billing and settlement component 212 may be used to process payments or rewards to responders who participated in the event. The user 102 may be billed some amount based on the subscription for handling the event. Some or all of the billed amount may be disbursed to responders.

A contact recommendation and verification service 214 may be used to verify the trust level of a person wanting to join a user's social network. The contact recommendation and verification service 214 may check criminal database, credit databases, user reviews of the person, or other sources of information to verify the person's identity, skill level, and level of trust. The contact recommendation and verification service 214 may make recommendations to the user 102 based on the user's travel habits, current location, or other information. It is not necessary that the one's request to support in emergency be raised to only the trusted network which already exists. An ad-hoc network may be created depending on the situation. For example, a person at a restaurant late at night may feel uncomfortable going to their car. A alert may be raised with "support" level priority. The responder may be a trustworthy person in the vicinity of the restaurant and may be suggested to the user. There are other examples where the trust between the contacts may be established (implicitly or explicitly) for a short duration of time. For example, a group of tourists in a new location may form a trusted network while on tour. Similarly, students going on a field trip may form an ad hock trusted network. Thus, if any one of the group were separated and needed help, others in the group may be preferentially notified and lend support.

Figure 3:
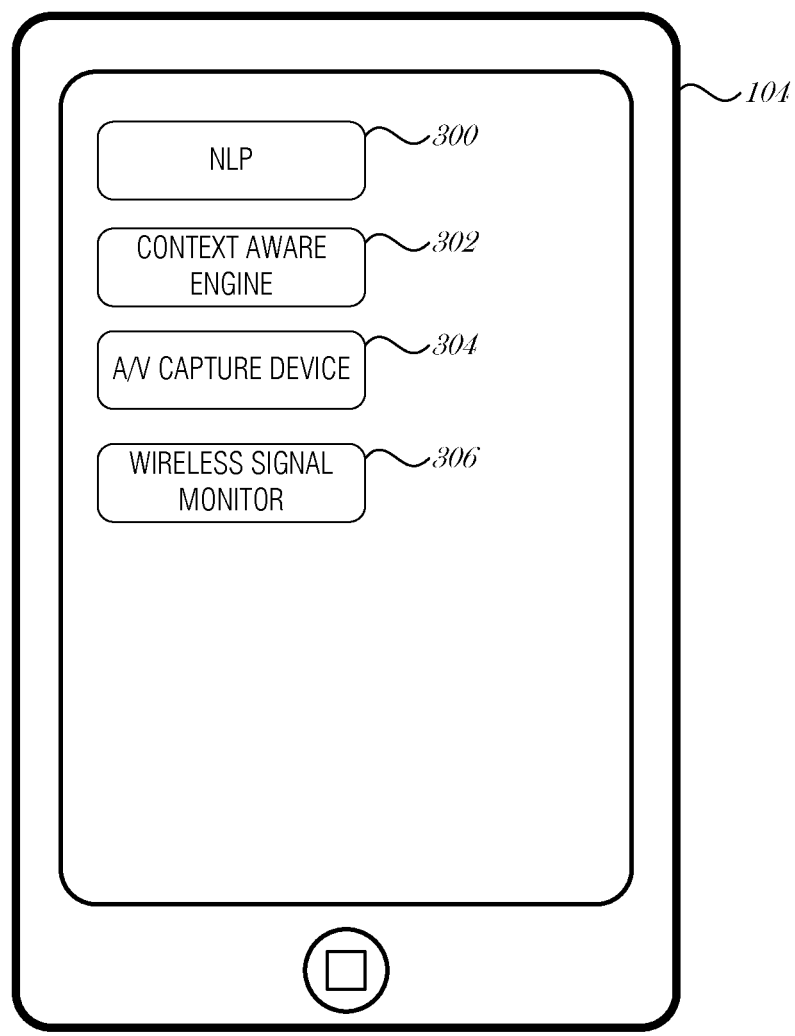
FIG. 3 is a diagram illustrating the mobile user device, according to an embodiment.

FIG. 3 is a diagram illustrating the mobile user device 104, according to an embodiment. The mobile user device 104 may include a user interface to initiate an alert message to the cloud service 110. The user interface may recognize the use of one or more buttons on a touchscreen, a gesture, or some other input such as shaking the device. The mobile user device 104 may include a natural language processor (NLP) 300 and context aware engine 302. The NLP 300 may be configured by the user 102 to recognize one or more utterances from the user 102 or generally recognizable utterances. For example, the NLP 300 may be configured to recognize the term "help". In conjunction with the context aware engine 302, the NLP 300 may distinguish from the term "help" being used in normal conversation and when it is used in a manner indicating a real emergency. For example, the context aware engine 302 may cross reference the user's location with the dialog captured by the NLP 300.

When the user 102 triggers an alert, the mobile user device 104 performs several actions in response. The mobile user device 104 may connect with the cloud service 110 and transmit a message to the cloud service 110 with the user's identity, an alert type, a message provided by the user, or the like. Additionally, the mobile user device 104 may begin recording audio or video using an audio visual capture device 304. The audio visual capture device 304 may include one or more cameras, one or more microphones, or the like. The cameras may capture optical data, infrared data, depth data, or the like. The recordings may be uploaded in real time or nearly real time to the cloud service 110. Uploading the data quickly reduces the chances that it is destroyed by fire, the attacker 106, or some other way. The mobile user device 104 includes a wireless signal monitor 306 to scan for wireless signals around the mobile user device 104. The wireless signal monitor 306 may record the wireless signal strengths, MAC address, device names, class of devices, channel, or other information about wireless signals. The wireless signal monitor 306 may upload the wireless signal information to the cloud service 110.

The audio, video, or wireless signal data may be authenticated by the mobile user device 104. For example, the mobile user device 104 may digitally sign the data before uploading it to the cloud service 110. The digital signature may be used to authenticate the source of the data for evidentiary use in court, for example. The data may be timestamped, geotagged, or otherwise annotated for authentication purposes.

As such, as an example, upon detecting the an alarm event, the user's smartphone sends an alert both via its cellular interface and via its Wi-Fi interface. The alert includes details such as the user identification and location. The alert sent via the cellular interface may be transmitted to a set of trusted responders via the cloud service 110. These responders might be selected from a social network list or from some other list. Alert messages may continue to be sent via the Wi-Fi interface to assist in location determination (via trilateration). Alert messages sent via Wi-Fi may be encoded using a private key that may be verified using a public key available from the cloud service 110.

In some instances, the user 102 may want to suppress or conceal his identity. In such a situation, the user 102 may set preferences indicating how the user 102 is to be identified in case of an event. The event orchestrator 206 may use an anonymized identification when notifying responders. The anonymized identification may be an alias, arbitrary value, or some other generic identifier and may be used in place of the user's identification based on user privacy choices. Thus, for example, when a person feels uncertain about walking to her car, she may call on the service for assistance, but not give out her actual name to responders in the area.

Figure 4:
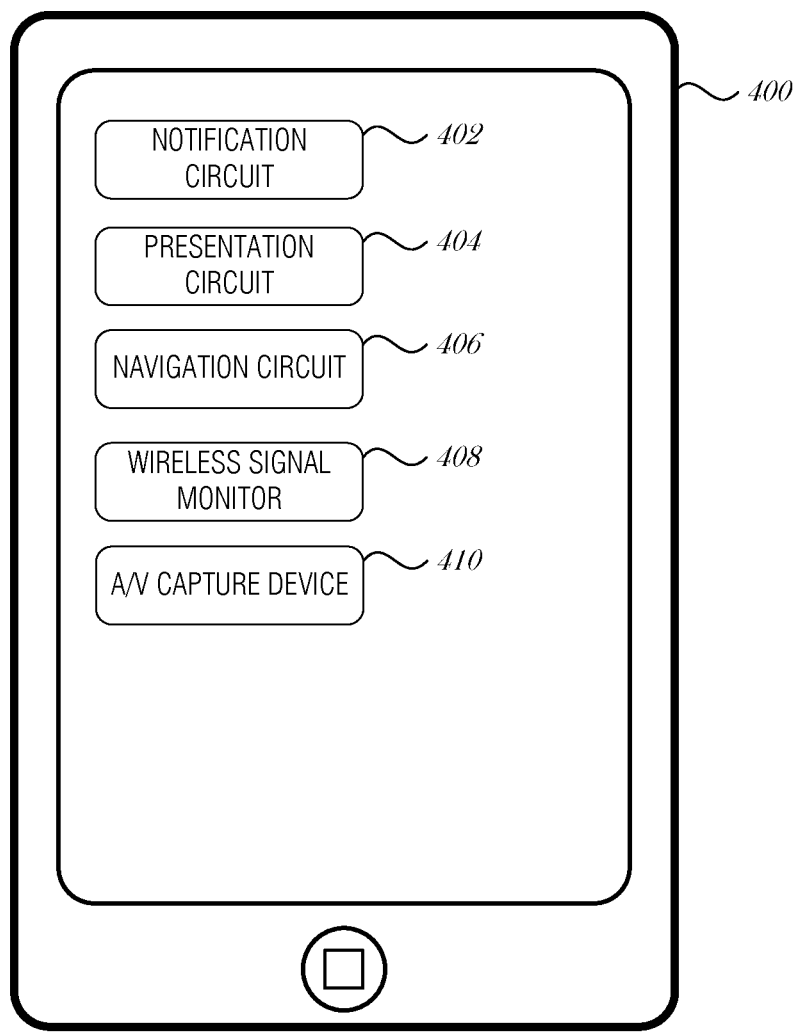
FIG. 4 is a diagram illustrating a responder device, according to an embodiment.

FIG. 4 is a diagram illustrating a responder device 400, according to an embodiment. The responder device 400 may include a notification circuit 402, which listens for alerts in a short-range wireless communication channel (e.g., Wi-Fi). Upon receiving an alert over short-range, the alert may be presented to the responder via a presentation circuit 404. The responder may be notified in various ways by the presentation circuit 404, such as with a flashing display, a haptic alert, an audio alert, or by causing another device to present an alarm. For example, the responder may have a smartphone that receives the alarm over Wi-Fi via the notification circuit 402 and causes a smartwatch that the responder is wearing to vibrate. In addition, the notification circuit 402 may receive alerts from the cloud service 110 when the responder is in the same trust network as the person triggering the alert.

The responder may be directed to the location of the alert by the navigation circuit 406. The navigation circuit 406 may reference maps, location databases, or other information to navigate the responder toward the origin of the alert. The navigation circuit 406 may communicate with a wireless signal monitor 408 to determine relative signal strengths of nearby wireless signals, and determine a navigational route based on the signal strengths. The wireless signal monitor 408 may be used to capture, record, transmit, or analyze wireless signals and information about wireless devices similar to the wireless signal monitor 306 in the mobile user device 104.

The responder may be provided directions or instructions from the cloud service 110 via the notification circuit 402 and presented by the presentation circuit 404. As discussed above, the directions may be navigational directions or other instructions to perform or not perform a task or activity.

The responder may be asked to record audio or video of the event or an area around the event. As with the mobile user device 104, the responder device 400 may include an audio visual capture device 410. The audio visual capture device 410 may be automatically activated and record audio or video, upload the recorded data to the cloud service 110, and perform other actions. For example, the audio visual capture device 410 may timestamp, geotag, digitally sign, or otherwise annotate the data before transmitting it to the cloud service 110 for storage. Use of such annotations or signatures may provide foundational basis for evidentiary use in litigation or other formal proceeding.

Figure 5:
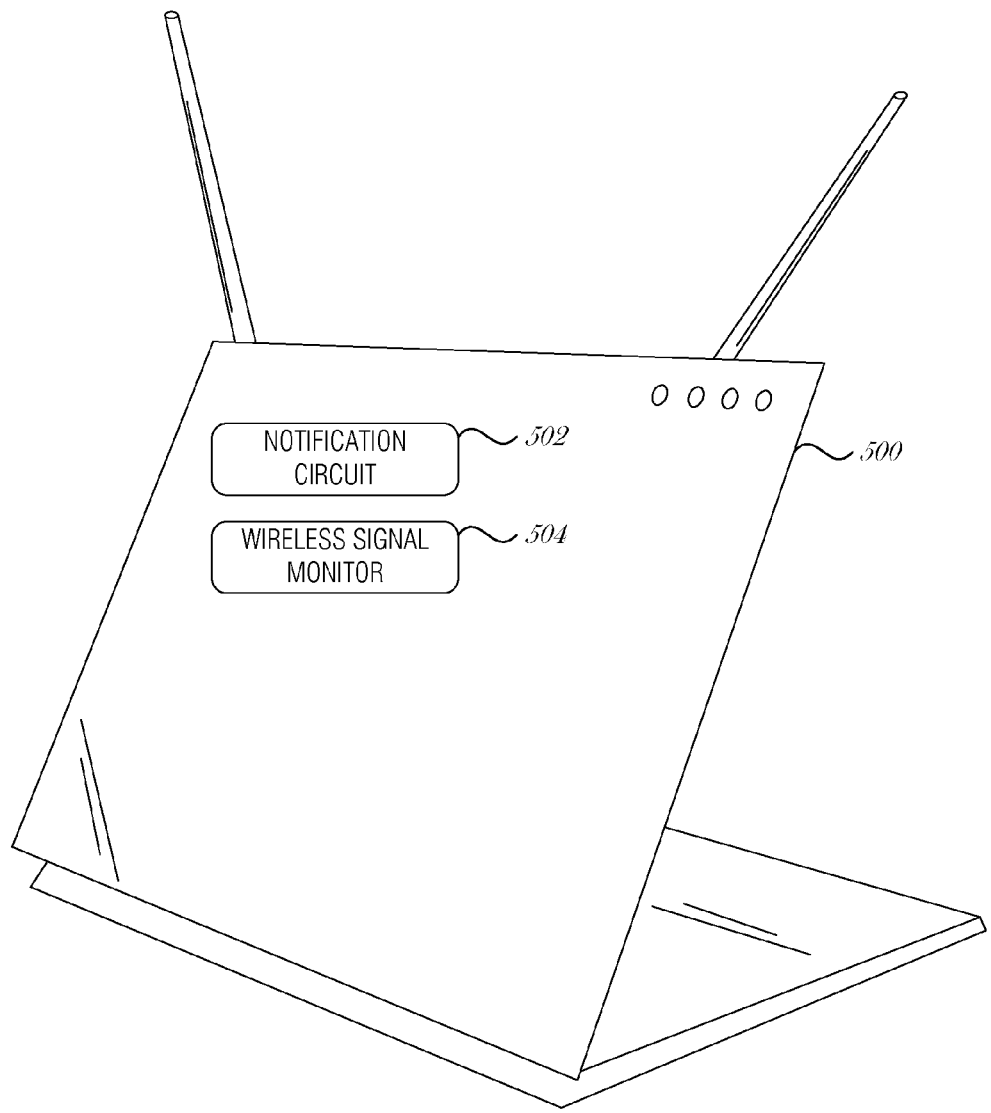
FIG. 5 is a diagram illustrating an access point, according to an embodiment.

FIG. 5 is a diagram illustrating an access point 500, according to an embodiment. The access point (AP) 500 may perform some of the same functions as the mobile user device 104 or responder device 400. The AP 500 may be a registered device with the cloud service 110. In some cases, a registered AP may be referred to as a safe e-house. The AP 500 may register and provide its location. The location may be a geolocation using coordinates (e.g., latitude and longitude) or a physical mailing address. Using geolocation coordinates, the AP 500 provides a way for other devices to determine their absolute position using trilateration (within a margin of error). The AP 500 may listen for an alert message from a nearby wireless device using a notification circuit 502. In response to receiving an alert message, the AP 500 may use a wireless monitor 504 to gather wireless information, similar to the data gathered by the mobile user device 104 or the responder device 400. The AP 500 may upload wireless data to the cloud service 110. In addition, the AP 500 may transmit wireless data to other devices in the event area to assist in trilateration. The AP 500 may sign or encrypt the information being sent to the devices in the event area to indicate an authenticated source.

Figure 6:
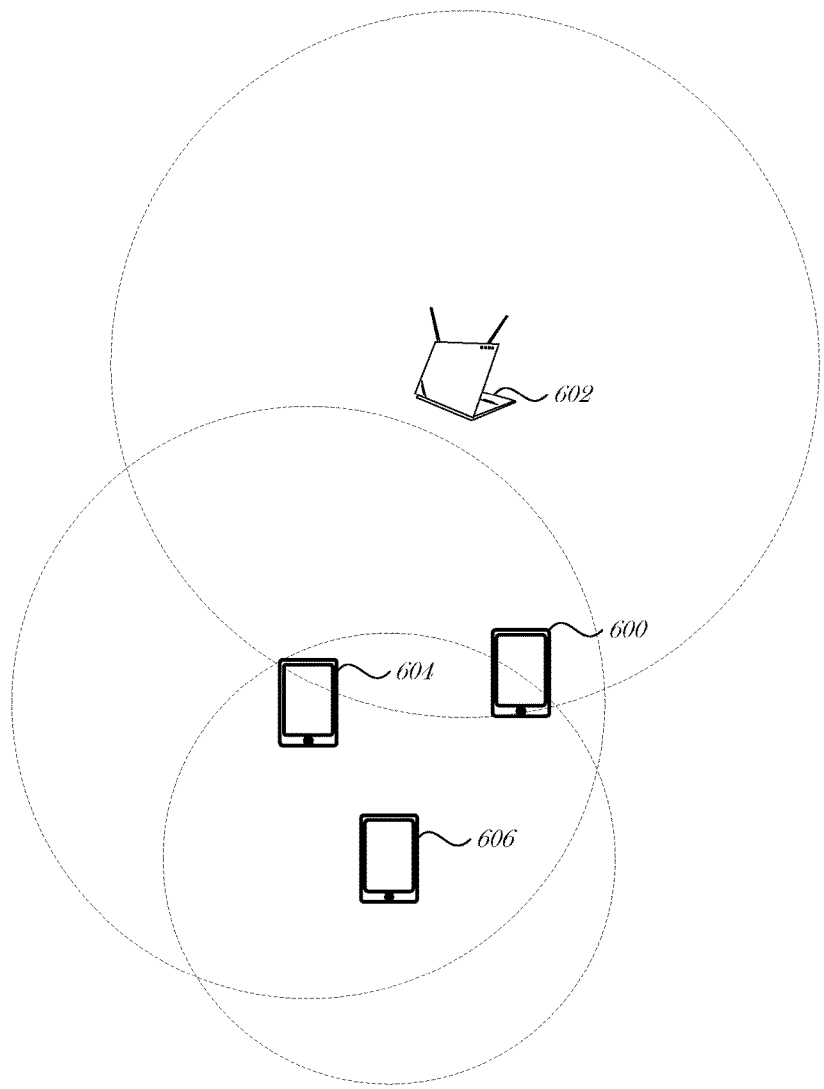
FIG. 6 is a diagram illustrating trilateration with wireless devices, according to an embodiment.

FIG. 6 is a diagram illustrating trilateration with wireless devices, according to an embodiment. Trilateration is the determination of absolute or relative locations by measurement of distances, using geometry. Wireless network trilateration uses parameters of wireless networks like the frequency of Wi-Fi signals, signal strengths, real coordinates of access points or other devices, and other information for distance estimation. The distances between devices may be provided using signal measurement techniques like a received signal strength (RSS), time of arrival of radio signals from transmitters (ToA), or time difference of arrival of several radio signals (TDoA). Similar approaches may be used with a triangulation method and the arrival angle of a signal. Without the use of exact coordinates, the received signal strength indicator (RSSI) may be used to determine relative distances and positions of devices in an environment. Adding more devices to the environment increases the accuracy and information available.

In FIG. 6, a first mobile device 600 is within the wireless range of three other devices: an access point 602, a responder's mobile device 604, and a bystander's mobile device 606. Each of the access point 602, the responder's mobile device 604, and the bystander's mobile device 606 have a corresponding wireless range, as illustrated by the dashed circles. Based on the RSSI from each of the devices 602, 604, and 606, the first mobile device 600 is able to determine an approximate location amongst the other devices. Trilateration calculations may be performed using various methods, such as solving a set of linear equations, linear least squares, non-linear least squares, etc.

As described above, using the protocol for an alert response, each device in the area broadcasts wireless information received at a particular device to all other devices in the area. As such, the first mobile device 600 both broadcasts wireless network information that it has detected and receives wireless network information from the other devices (e.g., access point 602 and responder's mobile device 604). The first mobile device 600 may also broadcast other channel state information, including channel being used, transmit power, and other aspects of the communication. With all of the wireless network information from each of the devices in the area, any one of the devices may calculate its own position or the position of another device.

Using the transmit power of access point 602, for example, the first mobile device 600 may be able to determine an approximate distance to the access point 602 based on a free space loss model or other spatial model. For example, by comparing the RSSI and the transmit power of the access point 602, the first mobile device 600 may determine a signal loss.

Thus, using the RSSI and transmit power, distance may be determined using various methods. One is the free space path loss method, where the signal loss is proportional to the square of the distance between the transmitter and receiver, and also proportional to the square of the frequency of the radio signal. In decibels, free space path loss may be represented as:

$$\text{FSPL(dB)} = 20\ \log_{10}(d) + 20\ \log_{10}(f) + C$$

where d is the distance and f is the frequency, and C is a constant with a value that depends on the units used for d and f. In the case where d is measured in kilometers and f is measured in MHz, the value C=32.45. Other values of C may be used depending on the units used for d and f.

The FSPL value is the computed using transmission and reception properties. One example calculation that may be used to determine FSPL is:

$$\text{FSPL} = Tx\ \text{Power} - Tx\ \text{Cable Loss} + Tx\ \text{Antenna Gain} + Rx\ \text{Antenna Gain} - Rx\ \text{Cable Loss} - Rx\ \text{Sensitivity} - \text{Fade Margin}$$

where the fade margin refers to the difference between the normal received power and the power required for minimum acceptable performance. Greater fade margins imply less frequent occurrences of minimum performance levels.

Because of reflection, diffraction, scattering, and other propagation errors, more complex models may be used to estimate the distance between a given transmitter and receiver.

In addition to wireless information, one or more of the devices may also broadcast position or location information. For example, the access point 602 may have a geolocation coordinate location that is highly accurate. When the access point 602 broadcasts its location, then other devices may use the relative positions determined from trilateration to determine approximate geolocations of one or more of the devices in the area. Additional devices may increase the accuracy and allow the devices to provide a more accurate device map or navigation. The location and/or paths of the devices in the area may be recorded by one or more of the devices and uploaded to the cloud service 110. Such information may allow crime investigators to recreate peoples' movement around the time of the event. For example, when a suspect who has their own mobile device flees the scene, it may be charted using the suspect's MAC address and signal strength.

The cloud service 110 may also maintain a map of devices in the area. Devices associated with responders, such as those that are registered with the cloud service 110, may be tracked in relation to the device associated with the victim. The cloud service 110 may use the map to direct traffic, navigate a person to another person or an area, navigate official response teams to the victim or responders, and the like.

The cloud service 110 may instruct individuals (e.g., responders) to adjust their signal strength in order to more precisely determine the location of the victim. Alternatively, the cloud service 110 may instruct individuals to change frequency bands (e.g., from 2.4 GHz to 5 GHz) in order to assist with trilateration. While 2.4 GHz has longer range, there may be fewer devices operating at 5 GHz, which may reduce interference. As another alternative, the operating environment 100 may instruct individuals to change channels within a frequency band. Changing channels may reduce signal interference.

Figure 7:
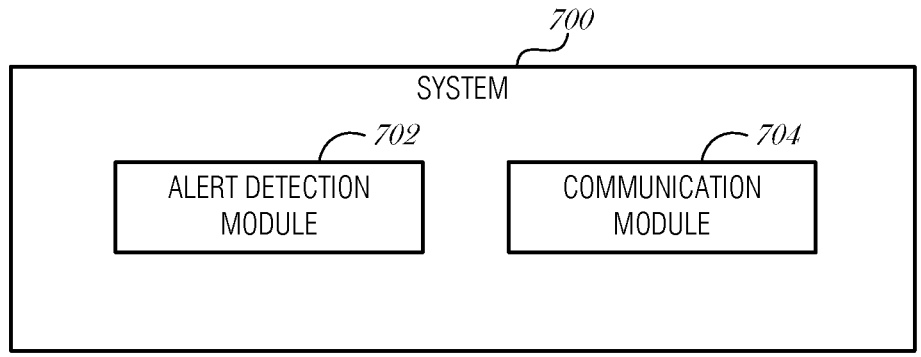
FIG. 7 is a block diagram illustrating a personal safety system, according to an embodiment.

FIG. 7 is a block diagram illustrating a personal safety system 700, according to an embodiment. The personal safety system 700 may include an alert detection module 702 and a communication module 704. The alert detection module 702 may be configured to receive, at a device, input indicating an alert event. An "alert event" in the context of this document is any event triggered by the user in response to a threatening, risky, dangerous, hazardous, perilous, or emergency situation, which may be real or perceived. Examples of alert events include, but are not limited to natural disasters, fires, storms, physical attack, physical threats, military action, accidental injury (e.g., falling down), missing person case, or the like. The device may be any type of compute device including, but not limited to a mobile phone, a smartphone, a phablet, a tablet, a personal digital assistant, a laptop, a digital camera, an in-vehicle infotainment system, a wearable device, a router, an access point, or the like.

In an embodiment, the input is received from a user of the device. In such an embodiment, the input may be a user interface actuation by the user of the device. For example, a panic button may be displayed on a touchscreen. When the user presses the button for more than a threshold time, the panic button may activate to trigger an alert event.

In another embodiment, the input may be a voice command issued by the user of the device. For example, the voice command may be an affirmative command such as "Computer; sound alert." Alternatively, the voice command may be based on natural language processing and be any type of utterance, such as a scream, a shout for help, or the like.

In another embodiment, the input may be a physical interaction with the device by the user. For example, the user may tap, shake, press a hard button or control on the body of the device, or otherwise interact physically with the device. In an embodiment, the physical interaction comprises the user shaking the device. Using a non-verbal, non-user interface option may be useful in certain situations, such as when being abducted and not wanting to alert the abductors of the existence of a call for help.

While the user may be the victim in some instances, in other instances, the user is a responder to an alert event. In this case, the responder receives notification of the alert event from a potential victim or other person raising an alert. Thus, in an embodiment, the input is received from a remote device (e.g., from the victim), the input initiated by a user of the remote device.

In an embodiment, the alert event comprises a crime, a natural disaster, or an emergency situation.

The communication module 704 may be configured to transmit information regarding the alert event to a cloud service and broadcast wireless network information of a wireless environment around the device, obtained by the device, to a plurality of devices in the wireless environment.

In an embodiment, to transmit information regarding the alert event, the communication module 704 is to transmit an identity of a user of the device and transmit information about the wireless environment around the device. Other information may be transmitted by the communication module 704, such as MAC addresses of devices in the area, the time or date, the last known location of the device, etc. The transmission may be authenticated, such as with a digital signature. Thus, in an embodiment, to transmit information regarding the alert, the communication module 704 is to encrypt the information before transmitting. In a further embodiment, the information is encrypted using a public key infrastructure. For example, the device may encrypt the transmission with a private key, such that the contents of the transmission may be decrypted using a public key.

In an embodiment, to transmit information about the wireless environment, the communication module 704 is to transmit wireless signal strengths of devices in the wireless environment. The cloud service may then record signal strengths received over a period, which may be used to determine which devices moved during the period.

In an embodiment, to transmit information about the wireless environment, the communication module 704 is to transmit media access control (MAC) addresses of devices in the wireless environment.

In an embodiment, the wireless network information comprises received signal strengths of devices in the wireless environment around the device. In another embodiment, the wireless network information comprises channel state information of devices in the wireless environment around the device Channel state information may include properties of to communication link. The information describes how a signal propagates from the transmitter to the receiver.

In an embodiment, the communication module 704 is to receive additional wireless network information from at least one of the plurality of devices in the wireless environment. Other devices in the wireless environment may broadcast wireless network information from their point of view, which may be used to determine locations of the devices relative to one another. In an embodiment, the additional wireless network information comprises received signal strengths of devices in the wireless environment around the least one of the plurality of devices in the wireless environment.

In another embodiment, the additional wireless network information comprises channel state information of devices in the wireless environment around the least one of the plurality of devices in the wireless environment.

In an embodiment, the personal safety system 700 includes a wireless analysis module to use the additional wireless network information from the at least one of the plurality of devices in the wireless environment along with the wireless network information obtained by the device to determine a location of the at least one of the plurality of devices in the wireless environment. In a further embodiment, to determine the location, the wireless analysis module is to use a free space loss calculation to determine distances between pairs of devices in the wireless environment and using trilateration techniques to determine position from the distances between the pairs of devices.

In an embodiment, the device is associated with a responder classification. In a further embodiment, the responder classification is a professional responder, a helper, or a predesignated responder. Other classifications may be used as well. In a further embodiment, the communication module 704 is to receive instructions from the cloud service, the instructions based on the responder classification. The instructions may be displayed to the responder using various mechanisms such as with a visual presentation, an audio presentation, haptic output, etc.

The responder may be directed to perform various actions, such as to record the scene, move to a particular location, change settings on their wireless device, or the like. Thus, in an embodiment, the instruction comprises directing the user of the device to perform an action. In an embodiment, the action comprises moving to a location. In an embodiment, the action comprises capturing audio or video. In such an embodiment, the communication module 704 is to transmit the captured audio or video to the cloud service. In another embodiment, the action comprises providing an emergency response to a person associated with one of the plurality of devices in the wireless environment. Emergency responses include actions such as applying pressure to a wound, performing cardiopulmonary resuscitation, or carrying water toward a fire.

Figure 8:
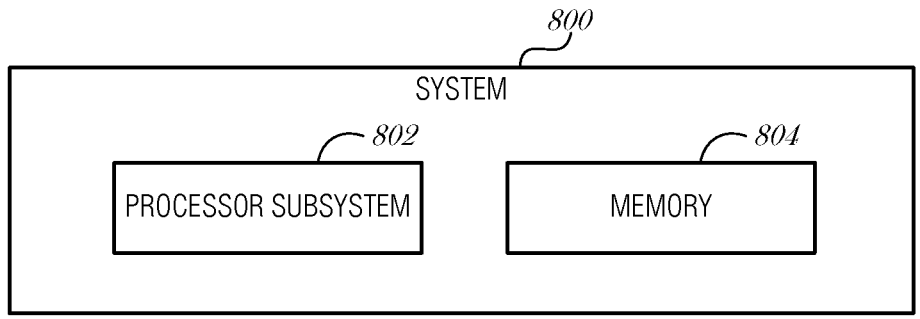
FIG. 8 is a block diagram illustrating a personal safety system, according to an embodiment.

FIG. 8 is a block diagram illustrating a personal safety system 800, according to an embodiment. The personal safety system 800 includes a processor system 802 and a memory 804 including instructions, which when executed by the processor system 802, cause the processor system 802 to perform the operations comprising receiving, at a device, input indicating an alert event; transmitting information regarding the alert event to a cloud service; and broadcasting wireless network information of a wireless environment around the device, obtained by the device, to a plurality of devices in the wireless environment.

In an embodiment, the input is received from a user of the device. In an embodiment, the input comprises a user interface actuation by the user of the device. In an embodiment, the input comprises a voice command issued by the user of the device. In an embodiment, the input comprises a physical interaction with the device by the user. In a further embodiment, the physical interaction comprises the user shaking the device.

In an embodiment, the input is received from a remote device, the input initiated by a user of the remote device.

In an embodiment, the alert event comprises a crime, a natural disaster, or an emergency situation.

In an embodiment, the instructions for transmitting information regarding the alert event comprise: transmitting an identity of a user of the device; and transmitting information about the wireless environment around the device. In a further embodiment, the instructions for transmitting information regarding the alert comprise encrypting the information before transmitting. In a further embodiment, the information is encrypted using a public key infrastructure.

In an embodiment, the instructions for transmitting information about the wireless environment comprise transmitting wireless signal strengths of devices in the wireless environment.

In an embodiment, the instructions for transmitting information about the wireless environment comprise transmitting media access control (MAC) addresses of devices in the wireless environment.

In an embodiment, the wireless network information comprises received signal strengths of devices in the wireless environment around the device. In an embodiment, the wireless network information comprises channel state information of devices in the wireless environment around the device.

In an embodiment, the memory 804 includes instructions for receiving additional wireless network information from at least one of the plurality of devices in the wireless environment. In an embodiment, the additional wireless network information comprises received signal strengths of devices in the wireless environment around the least one of the plurality of devices in the wireless environment. In an embodiment, the additional wireless network information comprises channel state information of devices in the wireless environment around the least one of the plurality of devices in the wireless environment.

In an embodiment, the memory 804 includes instructions for using the additional wireless network information from the at least one of the plurality of devices in the wireless environment along with the wireless network information obtained by the device to determine a location of the at least one of the plurality of devices in the wireless environment. In a further embodiment, to determine the location, the processor system is to use a free space loss calculation to determine distances between pairs of devices in the wireless environment and using trilateration techniques to determine position from the distances between the pairs of devices.

In an embodiment, the device is associated with a responder classification. In a further embodiment, the responder classification is a professional responder, a helper, or a predesignated responder. In a further embodiment, the memory 804 includes instructions for receiving instructions from the cloud service, the instructions based on the responder classification. In a further embodiment, the instruction comprises directing the user of the device to perform an action.

In an embodiment, the action comprises moving to a location. In an embodiment, the action comprises capturing audio or video. In such an embodiment, the memory 804 includes instructions for transmitting the captured audio or video to the cloud service. In an embodiment, the action comprises providing an emergency response to a person associated with one of the plurality of devices in the wireless environment.

Figure 9:
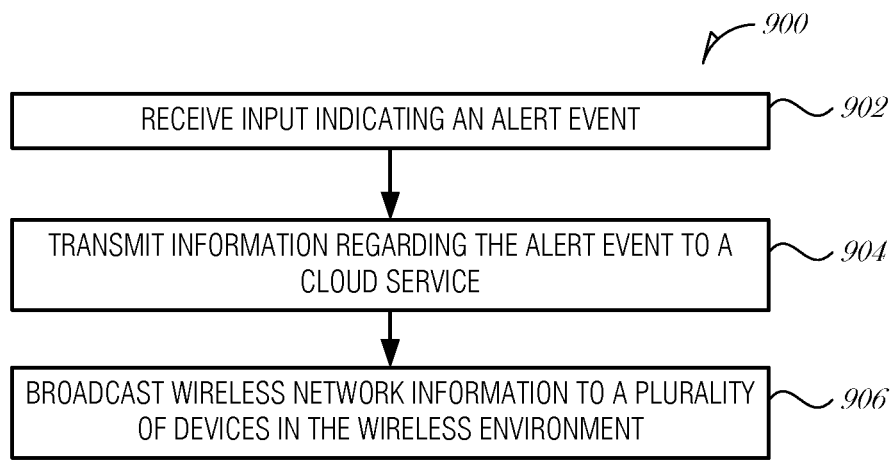
FIG. 9 is a flowchart illustrating a method of using a personal safety system, according to an embodiment.

FIG. 9 is a flowchart illustrating a method 900 of using a personal safety system, according to an embodiment. At block 902, input indicating an alert event is received at a device. In an embodiment, the input is received from a user of the device. In a further embodiment, the input comprises a user interface actuation by the user of the device. In an embodiment, the input comprises a voice command issued by the user of the device. In an embodiment, the input comprises a physical interaction with the device by the user. In a further embodiment, the physical interaction comprises the user shaking the device.

In an embodiment, the input is received from a remote device, the input initiated by a user of the remote device.

In an embodiment, the alert event comprises a crime, a natural disaster, or an emergency situation.

At block 904, information regarding the alert event is transmitted to a cloud service. In an embodiment, transmitting information regarding the alert event comprises transmitting an identity of a user of the device and transmitting information about the wireless environment around the device. In a further embodiment, transmitting information regarding the alert comprises encrypting the information before transmitting. In a further embodiment, the information is encrypted using a public key infrastructure.

In an embodiment, transmitting information about the wireless environment comprises transmitting wireless signal strengths of devices in the wireless environment.

In an embodiment, transmitting information about the wireless environment comprises transmitting media access control (MAC) addresses of devices in the wireless environment.

In an embodiment, the wireless network information comprises received signal strengths of devices in the wireless environment around the device.

In an embodiment, the wireless network information comprises channel state information of devices in the wireless environment around the device.

At block 906, wireless network information of a wireless environment around the device, obtained by the device, is broadcast to a plurality of devices in the wireless environment.

In an embodiment, the method 900 includes receiving additional wireless network information from at least one of the plurality of devices in the wireless environment. In a further embodiment, the additional wireless network information comprises received signal strengths of devices in the wireless environment around the least one of the plurality of devices in the wireless environment.

In an embodiment, the additional wireless network information comprises channel state information of devices in the wireless environment around the least one of the plurality of devices in the wireless environment.

In an embodiment, the method 900 includes using the additional wireless network information from the at least one of the plurality of devices in the wireless environment along with the wireless network information obtained by the device to determine a location of the at least one of the plurality of devices in the wireless environment. In a further embodiment, to determine the location, the method comprises using a free space loss calculation to determine distances between pairs of devices in the wireless environment and using trilateration techniques to determine position from the distances between the pairs of devices.

In an embodiment, the device is associated with a responder classification. In a further embodiment, the responder classification is a professional responder, a helper, or a predesignated responder.

In an embodiment, the method 900 includes receiving instructions from the cloud service, the instructions based on the responder classification. In a further embodiment, the instruction comprises directing the user of the device to perform an action. In an embodiment, the action comprises moving to a location. In an embodiment, the action comprises capturing audio or video. In an embodiment, the method 900 includes transmitting the captured audio or video to the cloud service. In an embodiment, the action comprises providing an emergency response to a person associated with one of the plurality of devices in the wireless environment.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 10:
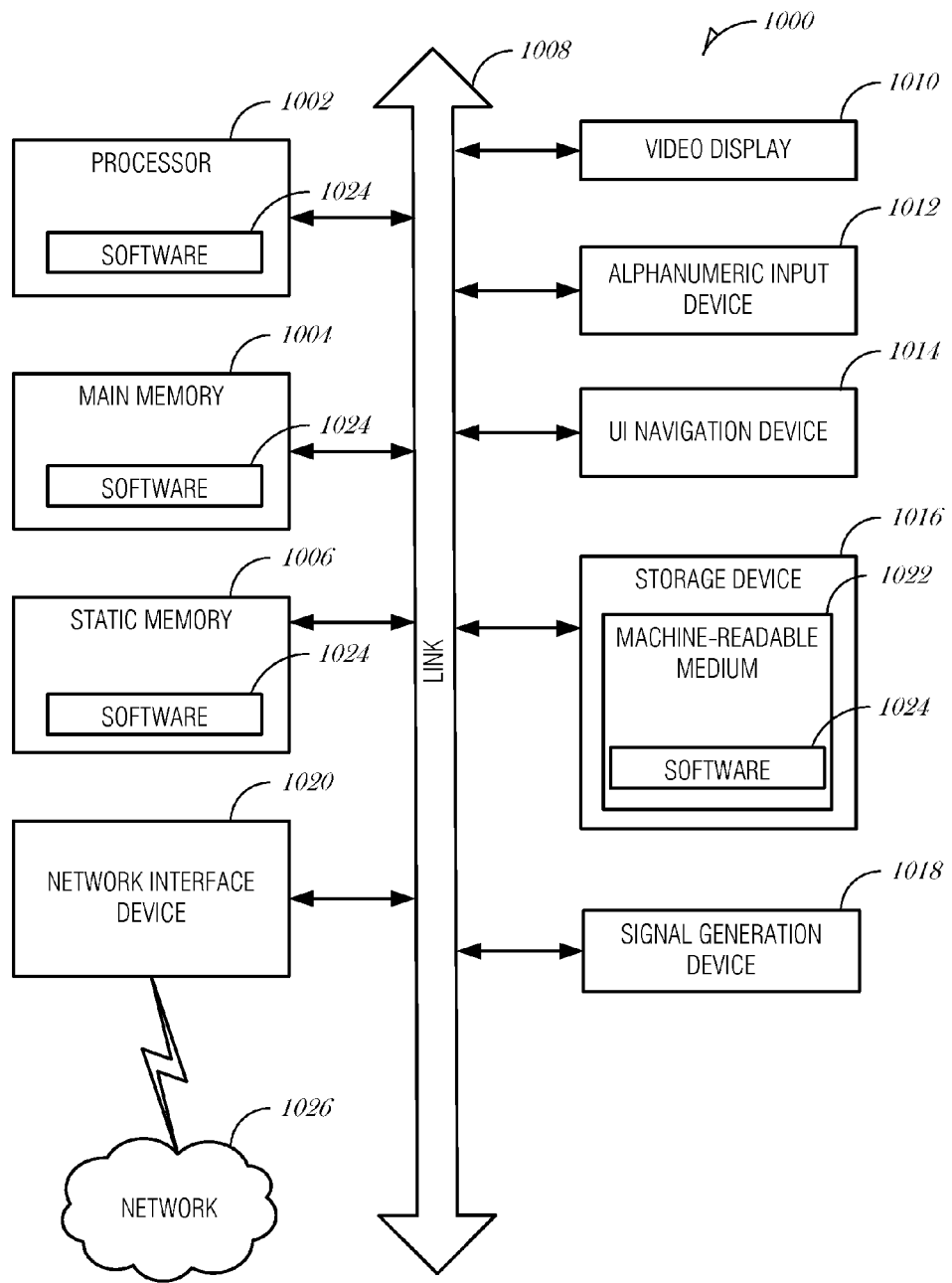
FIG. 10 is a block diagram illustrating an example machine upon which any one or more of the techniques (e.g., methodologies) discussed herein may perform, according to an example embodiment.

FIG. 10 is a block diagram illustrating a machine in the example form of a computer system 1000, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 1000 may further include a video display unit 1010, an alphanumeric input device 1012 (e.g., a keyboard), and a user interface (UI) navigation device 1014 (e.g., a mouse). In one embodiment, the video display unit 1010, input device 1012 and UI navigation device 1014 are incorporated into a touch screen display. The computer system 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples:

Example 1 includes subject matter for a personal safety system (such as a device, apparatus, or machine) comprising: an alert detection module to receive, at a device, input indicating an alert event; and a communication module to: transmit information regarding the alert event to a cloud service; and broadcast wireless network information of a wireless environment around the device, obtained by the device, to a plurality of devices in the wireless environment.

In Example 2, the subject matter of Example 1 may include, wherein the device comprises an access point.

In Example 3, the subject matter of any one of Examples 1 to 2 may include, wherein the device comprises a mobile user device.

In Example 4, the subject matter of any one of Examples 1 to 3 may include, wherein the input is received from a user of the device.

In Example 5, the subject matter of any one of Examples 1 to 4 may include, wherein the input comprises a user interface actuation by the user of the device.

In Example 6, the subject matter of any one of Examples 1 to 5 may include, wherein the input comprises a voice command issued by the user of the device.

In Example 7, the subject matter of any one of Examples 1 to 6 may include, wherein the input comprises a physical interaction with the device by the user.

In Example 8, the subject matter of any one of Examples 1 to 7 may include, wherein the physical interaction comprises the user shaking the device.

In Example 9, the subject matter of any one of Examples 1 to 8 may include, wherein the input is received from a remote device, the input initiated by a user of the remote device.

In Example 10, the subject matter of any one of Examples 1 to 9 may include, wherein the alert event comprises a crime, a natural disaster, or an emergency situation.

In Example 11, the subject matter of any one of Examples 1 to 10 may include, wherein to transmit information regarding the alert event, the communication module is to: transmit an identity of a user of the device; and transmit information about the wireless environment around the device.

In Example 12, the subject matter of any one of Examples 1 to 11 may include, wherein to transmit information regarding the alert, the communication module is to encrypt the information before transmitting.

In Example 13, the subject matter of any one of Examples 1 to 12 may include, wherein the information is encrypted using a public key infrastructure.

In Example 14, the subject matter of any one of Examples 1 to 13 may include, wherein to transmit information about the wireless environment, the communication module is to transmit wireless signal strengths of devices in the wireless environment.

In Example 15, the subject matter of any one of Examples 1 to 14 may include, wherein to transmit information about the wireless environment, the communication module is to transmit media access control (MAC) addresses of devices in the wireless environment.

In Example 16, the subject matter of any one of Examples 1 to 15 may include, wherein the wireless network information comprises received signal strengths of devices in the wireless environment around the device.

In Example 17, the subject matter of any one of Examples 1 to 16 may include, wherein the wireless network information comprises channel state information of devices in the wireless environment around the device.

In Example 18, the subject matter of any one of Examples 1 to 17 may include, wherein the communication module is to receive additional wireless network information from at least one of the plurality of devices in the wireless environment.

In Example 19, the subject matter of any one of Examples 1 to 18 may include, wherein the additional wireless network information comprises received signal strengths of devices in the wireless environment around the least one of the plurality of devices in the wireless environment.

In Example 20, the subject matter of any one of Examples 1 to 19 may include, wherein the additional wireless network information comprises channel state information of devices in the wireless environment around the least one of the plurality of devices in the wireless environment.

In Example 21, the subject matter of any one of Examples 1 to 20 may include, a wireless analysis module to use the additional wireless network information from the at least one of the plurality of devices in the wireless environment along with the wireless network information obtained by the device to determine a location of the at least one of the plurality of devices in the wireless environment.

In Example 22, the subject matter of any one of Examples 1 to 21 may include, wherein to determine the location, the wireless analysis module is to use a free space loss calculation to determine distances between pairs of devices in the wireless environment and using trilateration techniques to determine position from the distances between the pairs of devices.

In Example 23, the subject matter of any one of Examples 1 to 22 may include, wherein the device is associated with a responder classification.

In Example 24, the subject matter of any one of Examples 1 to 23 may include, wherein the responder classification is a professional responder, a helper, or a predesignated responder.

In Example 25, the subject matter of any one of Examples 1 to 24 may include, wherein the communication module is to receive instructions from the cloud service, the instructions based on the responder classification.

In Example 26, the subject matter of any one of Examples 1 to 25 may include, wherein the instruction comprises directing the user of the device to perform an action.

In Example 27, the subject matter of any one of Examples 1 to 26 may include, wherein the action comprises moving to a location.

In Example 28, the subject matter of any one of Examples 1 to 27 may include, wherein the action comprises capturing audio or video.

In Example 29, the subject matter of any one of Examples 1 to 28 may include, wherein the communication module is to transmit the captured audio or video to the cloud service.

In Example 30, the subject matter of any one of Examples 1 to 29 may include, wherein the action comprises providing an emergency response to a person associated with one of the plurality of devices in the wireless environment.

Example 31 includes subject matter for a personal safety system (such as a method, means for performing acts, machine readable medium including instructions that when performed by a machine cause the machine to performs acts, or an apparatus to perform) comprising: receiving, at a device, input indicating an alert event; transmitting information regarding the alert event to a cloud service; and broadcasting wireless network information of a wireless environment around the device, obtained by the device, to a plurality of devices in the wireless environment.

In Example 32, the subject matter of Example 31 may include, wherein the device comprises an access point.

In Example 33, the subject matter of any one of Examples 31 to 32 may include, wherein the device comprises a mobile user device.

In Example 34, the subject matter of any one of Examples 31 to 33 may include, wherein the input is received from a user of the device.

In Example 35, the subject matter of any one of Examples 31 to 34 may include, wherein the input comprises a user interface actuation by the user of the device.

In Example 36, the subject matter of any one of Examples 31 to 35 may include, wherein the input comprises a voice command issued by the user of the device.

In Example 37, the subject matter of any one of Examples 31 to 36 may include, wherein the input comprises a physical interaction with the device by the user.

In Example 38, the subject matter of any one of Examples 31 to 37 may include, wherein the physical interaction comprises the user shaking the device.

In Example 39, the subject matter of any one of Examples 31 to 38 may include, wherein the input is received from a remote device, the input initiated by a user of the remote device.

In Example 40, the subject matter of any one of Examples 31 to 39 may include, wherein the alert event comprises a crime, a natural disaster, or an emergency situation.

In Example 41, the subject matter of any one of Examples 31 to 40 may include, wherein transmitting information regarding the alert event comprises: transmitting an identity of a user of the device; and transmitting information about the wireless environment around the device.

In Example 42, the subject matter of any one of Examples 31 to 41 may include, wherein transmitting information regarding the alert comprises encrypting the information before transmitting.

In Example 43, the subject matter of any one of Examples 31 to 42 may include, wherein the information is encrypted using a public key infrastructure.

In Example 44, the subject matter of any one of Examples 31 to 43 may include, wherein transmitting information about the wireless environment comprises transmitting wireless signal strengths of devices in the wireless environment.

In Example 45, the subject matter of any one of Examples 31 to 44 may include, wherein transmitting information about the wireless environment comprises transmitting media access control (MAC) addresses of devices in the wireless environment.

In Example 46, the subject matter of any one of Examples 31 to 45 may include, wherein the wireless network information comprises received signal strengths of devices in the wireless environment around the device.

In Example 47, the subject matter of any one of Examples 31 to 46 may include, wherein the wireless network information comprises channel state information of devices in the wireless environment around the device.

In Example 48, the subject matter of any one of Examples 31 to 47 may include, receiving additional wireless network information from at least one of the plurality of devices in the wireless environment.

In Example 49, the subject matter of any one of Examples 31 to 48 may include, wherein the additional wireless network information comprises received signal strengths of devices in the wireless environment around the least one of the plurality of devices in the wireless environment.

In Example 50, the subject matter of any one of Examples 31 to 49 may include, wherein the additional wireless network information comprises channel state information of devices in the wireless environment around the least one of the plurality of devices in the wireless environment.

In Example 51, the subject matter of any one of Examples 31 to 50 may include, using the additional wireless network information from the at least one of the plurality of devices in the wireless environment along with the wireless network information obtained by the device to determine a location of the at least one of the plurality of devices in the wireless environment.

In Example 52, the subject matter of any one of Examples 31 to 51 may include, wherein determining the location comprises using a free space loss calculation to determine distances between pairs of devices in the wireless environment and using trilateration techniques to determine position from the distances between the pairs of devices.

In Example 53, the subject matter of any one of Examples 31 to 52 may include, wherein the device is associated with a responder classification.

In Example 54, the subject matter of any one of Examples 31 to 53 may include, wherein the responder classification is a professional responder, a helper, or a predesignated responder.

In Example 55, the subject matter of any one of Examples 31 to 54 may include, receiving instructions from the cloud service, the instructions based on the responder classification.

In Example 56, the subject matter of any one of Examples 31 to 55 may include, wherein the instruction comprises directing the user of the device to perform an action.

In Example 57, the subject matter of any one of Examples 31 to 56 may include, wherein the action comprises moving to a location.

In Example 58, the subject matter of any one of Examples 31 to 57 may include, wherein the action comprises capturing audio or video.

In Example 59, the subject matter of any one of Examples 31 to 58 may include, transmitting the captured audio or video to the cloud service.

In Example 60, the subject matter of any one of Examples 31 to 59 may include, wherein the action comprises providing an emergency response to a person associated with one of the plurality of devices in the wireless environment.

Example 61 includes an apparatus comprising means for performing any of the Examples 31-60.

Example 62 includes at least one machine-readable medium including instructions, which when executed by a machine, cause the machine to perform operations of any of the Examples 31-60.

Example 63 includes subject matter for a personal safety system (such as a device, apparatus, or machine) comprising: means for receiving, at a device, input indicating an alert event; means for transmitting information regarding the alert event to a cloud service; and means for broadcasting wireless network information of a wireless environment around the device, obtained by the device, to a plurality of devices in the wireless environment.

In Example 64, the subject matter of Example 63 may include, wherein the device comprises an access point.

In Example 65, the subject matter of any one of Examples 63 to 64 may include, wherein the device comprises a mobile user device.

In Example 66, the subject matter of any one of Examples 63 to 65 may include, wherein the input is received from a user of the device.

In Example 67, the subject matter of any one of Examples 63 to 66 may include, wherein the input comprises a user interface actuation by the user of the device.

In Example 68, the subject matter of any one of Examples 63 to 67 may include, wherein the input comprises a voice command issued by the user of the device.

In Example 69, the subject matter of any one of Examples 63 to 68 may include, wherein the input comprises a physical interaction with the device by the user.

In Example 70, the subject matter of any one of Examples 63 to 69 may include, wherein the physical interaction comprises the user shaking the device.

In Example 71, the subject matter of any one of Examples 63 to 70 may include, wherein the input is received from a remote device, the input initiated by a user of the remote device.

In Example 72, the subject matter of any one of Examples 63 to 71 may include, wherein the alert event comprises a crime, a natural disaster, or an emergency situation.

In Example 73, the subject matter of any one of Examples 63 to 72 may include, wherein the means for transmitting information regarding the alert event comprise: means for transmitting an identity of a user of the device; and means for transmitting information about the wireless environment around the device.

In Example 74, the subject matter of any one of Examples 63 to 73 may include, wherein the means for transmitting information regarding the alert comprise means for encrypting the information before transmitting.

In Example 75, the subject matter of any one of Examples 63 to 74 may include, wherein the information is encrypted using a public key infrastructure.

In Example 76, the subject matter of any one of Examples 63 to 75 may include, wherein the means for transmitting information about the wireless environment comprise means for transmitting wireless signal strengths of devices in the wireless environment.

In Example 77, the subject matter of any one of Examples 63 to 76 may include, wherein the means for transmitting information about the wireless environment comprise means for transmitting media access control (MAC) addresses of devices in the wireless environment.

In Example 78, the subject matter of any one of Examples 63 to 77 may include, wherein the wireless network information comprises received signal strengths of devices in the wireless environment around the device.

In Example 79, the subject matter of any one of Examples 63 to 78 may include, wherein the wireless network information comprises channel state information of devices in the wireless environment around the device.

In Example 80, the subject matter of any one of Examples 63 to 79 may include, means for receiving additional wireless network information from at least one of the plurality of devices in the wireless environment.

In Example 81, the subject matter of any one of Examples 63 to 80 may include, wherein the additional wireless network information comprises received signal strengths of devices in the wireless environment around the least one of the plurality of devices in the wireless environment.

In Example 82, the subject matter of any one of Examples 63 to 81 may include, wherein the additional wireless network information comprises channel state information of devices in the wireless environment around the least one of the plurality of devices in the wireless environment.

In Example 83, the subject matter of any one of Examples 63 to 82 may include, means for using the additional wireless network information from the at least one of the plurality of devices in the wireless environment along with the wireless network information obtained by the device to determine a location of the at least one of the plurality of devices in the wireless environment.

In Example 84, the subject matter of any one of Examples 63 to 83 may include, wherein the means for determining the location comprise means for using a free space loss calculation to determine distances between pairs of devices in the wireless environment and using trilateration techniques to determine position from the distances between the pairs of devices.

In Example 85, the subject matter of any one of Examples 63 to 84 may include, wherein the device is associated with a responder classification.

In Example 86, the subject matter of any one of Examples 63 to 85 may include, wherein the responder classification is a professional responder, a helper, or a predesignated responder.

In Example 87, the subject matter of any one of Examples 63 to 86 may include, means for receiving instructions from the cloud service, the instructions based on the responder classification.

In Example 88, the subject matter of any one of Examples 63 to 87 may include, wherein the instruction comprises directing the user of the device to perform an action.

In Example 89, the subject matter of any one of Examples 63 to 88 may include, wherein the action comprises moving to a location.

In Example 90, the subject matter of any one of Examples 63 to 89 may include, wherein the action comprises capturing audio or video.

In Example 91, the subject matter of any one of Examples 63 to 90 may include, means for transmitting the captured audio or video to the cloud service.

In Example 92, the subject matter of any one of Examples 63 to 91 may include, wherein the action comprises providing an emergency response to a person associated with one of the plurality of devices in the wireless environment.

Example 93 includes subject matter for a personal safety system (such as a device, apparatus, or machine) comprising: a processor system; and a memory including instructions, which when executed by the processor system, cause the processor system to perform the operations comprising: receiving, at a device, input indicating an alert event; transmitting information regarding the alert event to a cloud service; and broadcasting wireless network information of a wireless environment around the device, obtained by the device, to a plurality of devices in the wireless environment.

In Example 94, the subject matter of Example 93 may include, wherein the device comprises an access point.

In Example 95, the subject matter of any one of Examples 93 to 94 may include, wherein the device comprises a mobile user device.

In Example 96, the subject matter of any one of Examples 93 to 95 may include, wherein the input is received from a user of the device.

In Example 97, the subject matter of any one of Examples 93 to 96 may include, wherein the input comprises a user interface actuation by the user of the device.

In Example 98, the subject matter of any one of Examples 93 to 97 may include, wherein the input comprises a voice command issued by the user of the device.

In Example 99, the subject matter of any one of Examples 93 to 98 may include, wherein the input comprises a physical interaction with the device by the user.

In Example 100, the subject matter of any one of Examples 93 to 99 may include, wherein the physical interaction comprises the user shaking the device.

In Example 101, the subject matter of any one of Examples 93 to 100 may include, wherein the input is received from a remote device, the input initiated by a user of the remote device.

In Example 102, the subject matter of any one of Examples 93 to 101 may include, wherein the alert event comprises a crime, a natural disaster, or an emergency situation.

In Example 103, the subject matter of any one of Examples 93 to 102 may include, wherein the instructions for transmitting information regarding the alert event comprise: transmitting an identity of a user of the device; and transmitting information about the wireless environment around the device.

In Example 104, the subject matter of any one of Examples 93 to 103 may include, wherein the instructions for transmitting information regarding the alert comprise encrypting the information before transmitting.

In Example 105, the subject matter of any one of Examples 93 to 104 may include, wherein the information is encrypted using a public key infrastructure.

In Example 106, the subject matter of any one of Examples 93 to 105 may include, wherein the instructions for transmitting information about the wireless environment comprise transmitting wireless signal strengths of devices in the wireless environment.

In Example 107, the subject matter of any one of Examples 93 to 106 may include, wherein the instructions for transmitting information about the wireless environment comprise transmitting media access control (MAC) addresses of devices in the wireless environment.

In Example 108, the subject matter of any one of Examples 93 to 107 may include, wherein the wireless network information comprises received signal strengths of devices in the wireless environment around the device.

In Example 109, the subject matter of any one of Examples 93 to 108 may include, wherein the wireless network information comprises channel state information of devices in the wireless environment around the device.

In Example 110, the subject matter of any one of Examples 93 to 109 may include, instructions for receiving additional wireless network information from at least one of the plurality of devices in the wireless environment.

In Example 111, the subject matter of any one of Examples 93 to 110 may include, wherein the additional wireless network information comprises received signal strengths of devices in the wireless environment around the least one of the plurality of devices in the wireless environment.

In Example 112, the subject matter of any one of Examples 93 to 111 may include, wherein the additional wireless network information comprises channel state information of devices in the wireless environment around the least one of the plurality of devices in the wireless environment.

In Example 113, the subject matter of any one of Examples 93 to 112 may include, instructions for using the additional wireless network information from the at least one of the plurality of devices in the wireless environment along with the wireless network information obtained by the device to determine a location of the at least one of the plurality of devices in the wireless environment.

In Example 114, the subject matter of any one of Examples 93 to 113 may include, wherein to determine the location, the processor system is to use a free space loss calculation to determine distances between pairs of devices in the wireless environment and using trilateration techniques to determine position from the distances between the pairs of devices.

In Example 115, the subject matter of any one of Examples 93 to 114 may include, wherein the device is associated with a responder classification.

In Example 116, the subject matter of any one of Examples 93 to 115 may include, wherein the responder classification is a professional responder, a helper, or a predesignated responder.

In Example 117, the subject matter of any one of Examples 93 to 116 may include, instructions for receiving instructions from the cloud service, the instructions based on the responder classification.

In Example 118, the subject matter of any one of Examples 93 to 117 may include, wherein the instruction comprises directing the user of the device to perform an action.

In Example 119, the subject matter of any one of Examples 93 to 118 may include, wherein the action comprises moving to a location.

In Example 120, the subject matter of any one of Examples 93 to 119 may include, wherein the action comprises capturing audio or video.

In Example 121, the subject matter of any one of Examples 93 to 120 may include, instructions for transmitting the captured audio or video to the cloud service.

In Example 122, the subject matter of any one of Examples 93 to 121 may include, wherein the action comprises providing an emergency response to a person associated with one of the plurality of devices in the wireless environment.

Example 123 includes subject matter for a personal safety system (such as a device, apparatus, or machine) comprising: a threat listener to receive a request for assistance from a user device, the request for assistance including an identification of a user of the user device, a type of event, and a location of the user device; a contact filter to determine who to contact to respond to the request for assistance; and an event orchestrator to coordinate responders' activities, wherein upon receiving the request for assistance, the threat listener interfaces with the contact filter to determine a set of responders based on the request, and wherein the event orchestrator coordinates the activities of the set of responders.

In Example 124, the subject matter of Example 123 may include, wherein the request for assistance includes wireless signal information of devices around the location of the user device.

In Example 125, the subject matter of any one of Examples 123 to 124 may include, wherein the request for assistance is encrypted.

In Example 126, the subject matter of any one of Examples 123 to 125 may include, wherein the contact filter uses the location of the user device to determine the set of responders.

In Example 127, the subject matter of any one of Examples 123 to 126 may include, wherein the event orchestrator relays at least a portion of the request for assistance to the set of responders.

In Example 128, the subject matter of any one of Examples 123 to 127 may include, wherein the event orchestrator relays wireless signal information received from the user device to at least a portion of the set of responders.

In Example 129, the subject matter of any one of Examples 123 to 128 may include, wherein the event orchestrator monitors information received from the set of responders to further manage the activities of the set of responders.

In Example 130, the subject matter of any one of Examples 123 to 129 may include, wherein the information received from the set of responders includes video information of the environment around the request for assistance.

In Example 131, the subject matter of any one of Examples 123 to 130 may include, wherein the event orchestrator provides instructions to at least a portion of the set of responders.

In Example 132, the subject matter of any one of Examples 123 to 131 may include, wherein the instructions include a request to record video.

In Example 133, the subject matter of any one of Examples 123 to 132 may include, wherein the instructions include a request to move to a location.

In Example 134, the subject matter of any one of Examples 123 to 133 may include, wherein the event orchestrator monitors information received from a data capture device in an area around the location of the user device.

In Example 135, the subject matter of any one of Examples 123 to 134 may include, wherein the data capture device comprises a wireless access point.

In Example 136, the subject matter of any one of Examples 123 to 135 may include, wherein the data capture device comprises a camera.

In Example 137, the subject matter of any one of Examples 123 to 136 may include, wherein the event orchestrator provides instructions to an autonomous vehicle operating in an area around the location of the user device.

In Example 138, the subject matter of any one of Examples 123 to 137 may include, a billing and settlement component to invoice the user for responding to the request.

In Example 139, the subject matter of any one of Examples 123 to 138 may include, wherein the billing and settlement component is further to process rewards to at least a portion of the set of responders.

Example 140 includes subject matter for a personal safety system (such as a device, apparatus, or machine) comprising: a threat listener means for receiving a request for assistance from a user device, the request for assistance including an identification of a user of the user device, a type of event, and a location of the user device; a contact filter means for determining who to contact to respond to the request for assistance; and an event orchestrator means for coordinating responders' activities, wherein upon receiving the request for assistance, the threat listener means interfaces with the contact filter means to determine a set of responders based on the request, and wherein the event orchestrator means coordinates the activities of the set of responders.

In Example 141, the subject matter of Example 140 may include, wherein the request for assistance includes wireless signal information of devices around the location of the user device.

In Example 142, the subject matter of any one of Examples 140 to 141 may include, wherein the request for assistance is encrypted.

In Example 143, the subject matter of any one of Examples 140 to 142 may include, wherein the contact filter means uses the location of the user device to determine the set of responders.

In Example 144, the subject matter of any one of Examples 140 to 143 may include, wherein the event orchestrator means relays at least a portion of the request for assistance to the set of responders.

In Example 145, the subject matter of any one of Examples 140 to 144 may include, wherein the event orchestrator means relays wireless signal information received from the user device to at least a portion of the set of responders.

In Example 146, the subject matter of any one of Examples 140 to 145 may include, wherein the event orchestrator means monitors information received from the set of responders to further manage the activities of the set of responders.

In Example 147, the subject matter of any one of Examples 140 to 146 may include, wherein the information received from the set of responders includes video information of the environment around the request for assistance.

In Example 148, the subject matter of any one of Examples 140 to 147 may include, wherein the event orchestrator means provides instructions to at least a portion of the set of responders.

In Example 149, the subject matter of any one of Examples 140 to 148 may include, wherein the instructions include a request to record video.

In Example 150, the subject matter of any one of Examples 140 to 149 may include, wherein the instructions include a request to move to a location.

In Example 151, the subject matter of any one of Examples 140 to 150 may include, wherein the event orchestrator means monitors information received from a data capture device in an area around the location of the user device.

In Example 152, the subject matter of any one of Examples 140 to 151 may include, wherein the data capture device comprises a wireless access point.

In Example 153, the subject matter of any one of Examples 140 to 152 may include, wherein the data capture device comprises a camera.

In Example 154, the subject matter of any one of Examples 140 to 153 may include, wherein the event orchestrator means provides instructions to an autonomous vehicle operating in an area around the location of the user device.

In Example 155, the subject matter of any one of Examples 140 to 154 may include, a billing and settlement component to invoice the user for responding to the request.

In Example 156, the subject matter of any one of Examples 140 to 155 may include, wherein the billing and settlement component is further to process rewards to at least a portion of the set of responders.

Example 157 includes subject matter for a personal safety system (such as a method, means for performing acts, machine readable medium including instructions that when performed by a machine cause the machine to performs acts, or an apparatus to perform) comprising: receiving, at a processing system, a request for assistance from a user device, the request for assistance including an identification of a user of the user device, a type of event, and a location of the user device; determining, based on the request, a set of responders to contact to respond to the request for assistance; and coordinating the activities of the set of responders.

In Example 158, the subject matter of Example 157 may include, wherein the request for assistance includes wireless signal information of devices around the location of the user device.

In Example 159, the subject matter of any one of Examples 157 to 158 may include, wherein the request for assistance is encrypted.

In Example 160, the subject matter of any one of Examples 157 to 159 may include, wherein determining the set of responders includes using the location of the user device to determine the set of responders.

In Example 161, the subject matter of any one of Examples 157 to 160 may include, wherein coordinating the activities of the set of responders includes relaying at least a portion of the request for assistance to the set of responders.

In Example 162, the subject matter of any one of Examples 157 to 161 may include, wherein coordinating the activities of the set of responders includes relaying wireless signal information received from the user device to at least a portion of the set of responders.

In Example 163, the subject matter of any one of Examples 157 to 162 may include, wherein coordinating the activities of the set of responders includes monitoring information received from the set of responders to further manage the activities of the set of responders.

In Example 164, the subject matter of any one of Examples 157 to 163 may include, wherein the information received from the set of responders includes video information of the environment around the request for assistance.

In Example 165, the subject matter of any one of Examples 157 to 164 may include, wherein coordinating the activities of the set of responders includes providing instructions to at least a portion of the set of responders.

In Example 166, the subject matter of any one of Examples 157 to 165 may include, wherein the instructions include a request to record video.

In Example 167, the subject matter of any one of Examples 157 to 166 may include, wherein the instructions include a request to move to a location.

In Example 168, the subject matter of any one of Examples 157 to 167 may include, wherein coordinating the activities of the set of responders includes monitoring information received from a data capture device in an area around the location of the user device.

In Example 169, the subject matter of any one of Examples 157 to 168 may include, wherein the data capture device comprises a wireless access point.

In Example 170, the subject matter of any one of Examples 157 to 169 may include, wherein the data capture device comprises a camera.

In Example 171, the subject matter of any one of Examples 157 to 170 may include, wherein coordinating the activities of the set of responders includes providing instructions to an autonomous vehicle operating in an area around the location of the user device.

In Example 172, the subject matter of any one of Examples 157 to 171 may include, invoicing the user for responding to the request.

In Example 173, the subject matter of any one of Examples 157 to 172 may include, processing rewards to at least a portion of the set of responders.

Example 174 includes an apparatus comprising means for performing any of the Examples 157-173.

Example 175 includes at least one machine-readable medium including instructions, which when executed by a machine, cause the machine to perform operations of any of the Examples 157-173.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A personal safety system, the system comprising:
a wireless access point device including:
an alert detection circuit to:
receive, at the wireless access point device, input indicating an alert event, wherein the input is received from a remote mobile user device, the input initiated by a user of the remote mobile user device; and
a communication circuit to, in response to receiving input indicating an alert event, to:
obtain wireless network information of a wireless environment around the wireless access point device, wherein the wireless network information includes wireless access point devices and mobile user devices;
generate a message including the wireless network information;
transmit the message and the alert event to a cloud service; and
broadcast, from the wireless access point device to a plurality of devices in the wireless environment, the wireless network information of the wireless environment around the wireless access point device.

2. The system of claim 1, wherein to transmit information regarding the alert event, the communication circuit is to:
transmit an identity of a user of the remote mobile user device; and
transmit information about the wireless environment around the remote mobile user device.

3. The system of claim 2, wherein to transmit information regarding the alert, the communication circuit is to encrypt the information before transmitting.

4. The system of claim 2, wherein to transmit information about the wireless environment, the communication circuit is to transmit wireless signal strengths of devices in the wireless environment.

5. The system of claim 2, wherein to transmit information about the wireless environment, the communication circuit is to transmit media access control (MAC) addresses of devices in the wireless environment.

6. The system of claim 1, wherein the wireless network information comprises received signal strengths of devices in the wireless environment around the wireless access point device.

7. The system of claim 1, wherein the wireless network information comprises channel state information of devices in the wireless environment around the wireless access point device.

8. The system of claim 1, wherein the communication circuit is to receive additional wireless network information from at least one of the plurality of devices in the wireless environment.

9. The system of claim 8, wherein the additional wireless network information comprises received signal strengths of devices in the wireless environment around the least one of the plurality of devices in the wireless environment.

10. The system of claim 8, further comprising a wireless analysis circuit to use the additional wireless network information from the at least one of the plurality of devices in the wireless environment along with the wireless network information obtained by the wireless access point device to determine a location of the at least one of the plurality of devices in the wireless environment.

11. The system of claim 10, wherein to determine the location, the wireless analysis circuit is to use a free space loss calculation to determine distances between pairs of devices in the wireless environment and using trilateration techniques to determine position from the distances between the pairs of devices.

12. The system of claim 1, wherein the remote mobile user device is associated with a responder classification.

13. The system of claim 12, wherein the responder classification is a professional responder, a helper, or a predesignated responder.

14. The system of claim 12, wherein the communication circuit is to receive instructions from the cloud service, the instructions based on the responder classification.

15. At least one non-transitory machine-readable medium including instructions, which when executed by a machine, cause the machine to:
receive, at a wireless access point device, input indicating an alert event, the input received from a remote mobile user device, the input initiated by a user of the remote mobile user device; and
in response to receiving input indicating an alert event:
obtain wireless network information of a wireless environment around the wireless access point device, wherein the wireless network information includes wireless access point devices and mobile user devices;
generate a message including the wireless network information;
transmit the message and the alert event to a cloud service; and
broadcast, from the wireless access point device to a plurality of devices in the wireless environment, the wireless network information of the wireless environment around the wireless access point device.

16. The at least one non-transitory machine-readable medium of claim 15, wherein the instructions to transmit information regarding the alert event comprise instructions to:
transmit an identity of a user of the remote mobile user device; and
transmit information about the wireless environment around the remote mobile user device.

17. The at least one non-transitory machine-readable medium of claim 16, wherein the instructions to transmit information about the wireless environment comprise instructions to transmit wireless signal strengths of devices in the wireless environment.

18. The at least one non-transitory machine-readable medium of claim 16, wherein the instructions to transmit information about the wireless environment comprise instructions to transmit media access control (MAC) addresses of devices in the wireless environment.

19. The at least one non-transitory machine-readable medium of claim 15, wherein the wireless network information comprises channel state information of devices in the wireless environment around the wireless access point device.

20. A method of using a personal safety system, the method comprising:
receiving, at a wireless access point device, input indicating an alert event, wherein the input is received from a remote mobile user device, and initiated by a user of the remote mobile user device; and
in response to receiving input indicating an alert event:

obtaining wireless network information of a wireless environment around the wireless access point device, wherein the wireless network information includes wireless access point devices and mobile user devices;

generating a message including the wireless network information;

transmitting the message and the alert event to a cloud service; and broadcasting, from the wireless access point device to a plurality of devices in the wireless environment, the wireless network information of the wireless environment around the wireless access point device.

21. The method of claim 20, further comprising receiving additional wireless network information from at least one of the plurality of devices in the wireless environment.

22. The system of claim 1, wherein the alert event of the input comprises a crime, a natural disaster, or an emergency situation.

23. The at least one non-transitory machine-readable medium of claim 15, wherein the alert event comprises a crime, a natural disaster, or an emergency situation.

24. The method of claim 20, wherein the alert event comprises a crime, a natural disaster, or an emergency situation.

* * * * *